United States Patent [19]

Skoog

[11] 4,119,897
[45] Oct. 10, 1978

[54] STATIC CONVERTOR

[75] Inventor: Hans Skoog, Vasteras, Sweden

[73] Assignee: ASEA AB, Vasteras, Sweden

[21] Appl. No.: 721,995

[22] Filed: Sep. 9, 1976

[30] Foreign Application Priority Data

Sep. 24, 1975 [SE] Sweden .............................. 7510689

[51] Int. Cl.² .............................................. H02P 5/00
[52] U.S. Cl. ..................... 318/331; 318/345 AB;
318/327; 318/317; 318/459; 318/434
[58] Field of Search .............. 318/317, 327, 331, 459,
318/434, 345 A, 345 C, 345 CA, 345 G, 345 H;
321/16, 18; 363/74

[56] References Cited

U.S. PATENT DOCUMENTS

| 3,508,132 | 4/1970 | Peterson | 318/327 |
| 3,551,775 | 12/1970 | Safiuddin | 318/434 |
| 3,599,063 | 8/1971 | Nanai | 318/327 |
| 3,649,897 | 3/1972 | Messick | 318/434 |
| 3,694,720 | 9/1972 | Nakajima | 318/327 |
| 3,983,464 | 9/1976 | Peterson | 318/327 |

Primary Examiner—Robert K. Schaefer
Assistant Examiner—Eugene S. Indyk
Attorney, Agent, or Firm—Watson, Cole, Grindle & Watson

[57] ABSTRACT

A static convertor with DC terminals for connection to a load object with a variable electromotive force includes a control arrangement for controlling the direct voltage of the convertor between maximum and minimum values, an arrangement for controlling the minimum value being connected to and dependent on the output of a sensing device which senses a quantity corresponding to the e.m.f. of the load object. The minimum value is limited to an upper value at which the commutation ability of the convertor is at least as great as the expected maximum direct current.

5 Claims, 3 Drawing Figures

STATIC CONVERTOR

BACKGROUND OF THE INVENTION

1. Field of the Invention

The present invention relates to a static convertor with AC terminals for connection to an AC voltage source and with DC terminals for connection to a load object with a variable electromotive force, said convertor comprising control members for controlling the direct voltage of the convertor between a maximum value and a mimimum value.

2. The Prior Art

The direct voltage $U_{d\alpha}$ of a conventional, controlled convertor is obtained, in principle, from the expression $$U_{d\alpha} = U_d \cdot \cos \alpha$$

where $\alpha$ is the control angle and $U_d$ the direct voltage obtained if $\alpha = 0$. A maximum direct voltage in rectifier operation ($0 \leq \alpha < 90°$) is obtained theoretically at $\alpha = 0$, and maximum direct voltage in inverter opration ($90° < \alpha \leq 180°$) is obtained at $\alpha = 180°$. In practice, however, the control angle is always limited upwards as well as downwards in consideration of the commutation. The control angle $\alpha$ thus varies, in known convertors, between a minimum value $\alpha_{min}$ and a maximum value $\alpha_{max}$. The maximum value $\alpha_{max}$ is determined by the necessity of ending the commutation process and of keeping the previously conducting rectifiers able to support offstate voltage at the zero passage of the commutating voltage at the latest, which occurs at $\alpha = 180°$. The time required for the commutating process increases with the load current of the convertor, and $\alpha_{max}$ must therefore be chosen so low that the maximum current of the convertor may be commutated with certainty. In typical convertors this means that $\alpha_{max}$ must be chosen relatively low, and in known convertors $\alpha_{max}$ lies, for example, at 140°. This means that the maximally available direct voltage in inverter operation is considerably lower than $U_d$.

In, for example, the typical application where a convertor is used for supplying and regulating a DC motor, a convertor must be dimensioned so that its maximum direct voltage in inverter operation ($/U_d \cdot \cos \alpha_{max}/$) exceeds the maximum electromotive force present in the motor. This is necessary if the motor current under all circumstances is to be able to be controlled down to zero. For given motor characteristics this means that a known convertor under practically all operational conditions will be considerably over-dimensioned, that is badly utilized.

SUMMARY OF THE INVENTION

The invention aims to provide a convertor of the kind mentioned in the introduction, which is better utilized than previously known convertors.

According to the invention, the convertor is provided with means for controlling the direct voltage between maximum and minimum values, which means is responsive to the output of a sensing means which senses a quantity corresponding to the e.m.f. of the load object. The minimum value is limited to an upper value at which the commutating ability of the convertor is at least as great as the expected maximum direct current of the equipment. The means for limiting the direct current to a maximum value operates in dependence on the minimum value of the direct voltage.

BRIEF DESCRIPTION OF THE DRAWINGS

In the following the invention will be described in greater detail with reference to the accompanying FIGS. 1-3.

DESCRIPTION OF THE PREFERRED EMBODIMENTS

Figure 1:
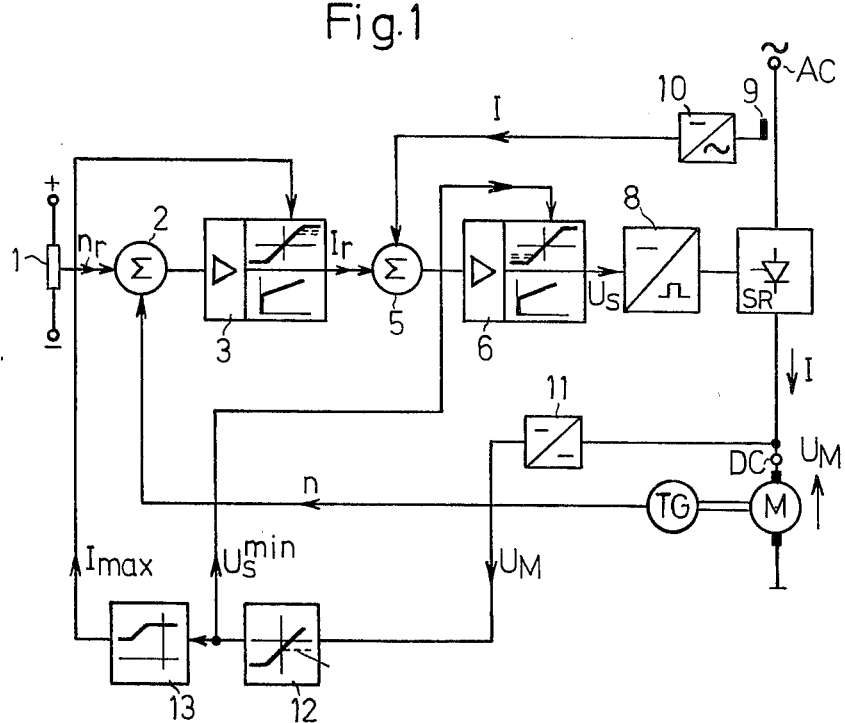
FIG. 1 shows a circuit diagram of a convertor according to the invention.

FIG. 1 shows a controlled convertor SR which is capable of operating in inverter operation. The convertor may be of an arbitrary type, for example a conventional, bridge-connected convertor with thyristors in all bridge branches. The convertor has an AC terminal for connection to an alternating voltage source, for example a common alternating voltage network, and a DC terminal DC for connection to a load object. In the shown example, the load object consists of the armature of a DC motor M, the speed of which is controlled with the help of the convertor. This has a regulating system, known per se, for speed regulation of the motor. A tachometer generator TG is mechanically coupled to the motor and generates a signal n proportional to the speed of rotation of the motor. From a reference value generator 1, schematically shown as a potentiometer supplied with direct voltage, there is obtained an adjustable speed reference value $n_r$. This is compared in the comparison device 2 with the speed $n$, and the difference is supplied to the speed regulator 3 which, in known manner, may have PI characteristics as indicated in the figure. The output signal $I_r$ of the regulator constitutes the reference value for the convertor current and is limited upwards to a value $I_{max}$ which is obtained from the function generator 13. The current reference value is supplied to a comparison device 5. From a current transformer 9 and a rectifier 10 there is obtained a signal corresponding to the direct current I of the convertor. The difference between $I_r$ and I is supplied to a current regulator 6 which, like the speed regulator 3, may be of the PI type. The output signal of the regulator 6 has a lower limit value of $U_s^{min}$ in a manner which will be described in more detail below. The limited output signal $U_S$ is supplied to the control device 8 of the convertor and determines the direct voltage of the convertor, which is also designated $U_S$. As mentioned above, it is already known to limit the control angle of a convertor to a fixed lower value ($\alpha_{min}$) and to another fixed, upper value ($\alpha_{max}$). This is (in the case of constant supply alternating voltage) the same as to limit the direct voltage of the convertor to an upper value $U_d \cos \alpha_{min}$ and to a lower value $U_d \cos \alpha_{max}$.

According to the invention, the lower limit to the direct voltage, that is the upper limit to the control angle, is now variable in dependence on the e.m.f. of the load object. This e.m.f. may, in the shown case with a motor as the load object, be determined in different ways. One way is to measure the load voltage and from it subtract the inner resistive and inductive voltage drops of the motor. In the case of moderate rates of current alterations, these voltage drops are normally so small or of such short duration that they may be neglected in this connection, and the motor voltage can then be used as a measure of the e.m.f. of the motor. This case is shown in FIG. 1. The motor voltage $U_M$ is supplied to a voltage device 11 which converts the voltage into a signal of a suitable magnitude proportional thereto. The measuring device 11 may, for example, consist of a voltage divider. If necessary, the measurement signal can be filtered in a low-pass filter. The time constant of this filter is chosen so that the brief inductive voltage drops are filtered away, whereas the slower changes in the e.m.f. of the motor are not influenced by the filter.

Certain motors are provided with special terminals which are arranged so that a voltage is obtained from these, from which the inner inductive voltage drops are eliminated. This voltage thus provides a better measure of the e.m.f. of the motor than the armature voltage does.

Also other ways of determining the e.m.f. of the motor can be used in connection with the invention. From the measured armature voltage and current the e.m.f. of the motor can be easily estimated at each moment, if desired, by forming the resistive and inductive inner voltage drops and subtracting these from the armature voltage. Another way is to arranged a multiplicator which forms the product of quantities corresponding to the speed of the motor and its flux, which product constitutes the e.m.f. of the motor.

The signal $U_M$ corresponding to the e.m.f. of the motor is supplied to a function generator 12. The function generator emits a signal $U_S^{min}$, dependent on $U_M$, which is supplied to the current regulator 6 in such a way that the lower limit of the convertor voltage follows the value $U_S^{min}$. The mode of operation of the function generator 12 will be described in greater detail below with reference to FIG. 2.

The signal $U_S^{min}$ is passed to a second function generator 13 which delivers a signal $I_{max}$, dependent on $U_S^{min}$, which is passed to the current regulator 3 in such a way that the current reference value $I_r$ is limited to an upper value of $I_{max}$. The mode of operation of the function generator 13 will be described below with reference to FIG. 3.

Figure 2:
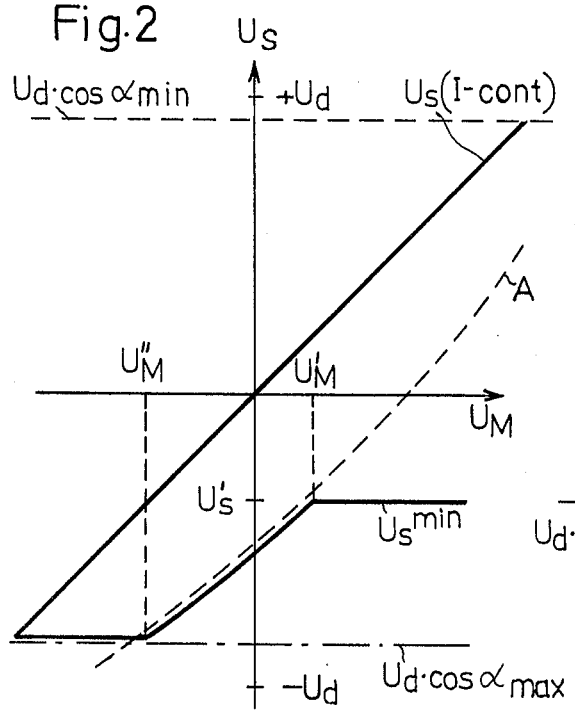
FIG. 2 shows how the control angle of the convertor, and thus its direct voltage, are limited in dependence on the electromotive force of the load object.

FIG. 2 shows the direct voltage $U_S$ of the convertor as a function of the e.m.f. $U_M$ of the motor (inner voltage drops in the motor and convertor have been neglected). The theoretical maximum voltage of the convertor is $+U_d$ and its theoretical minimum voltage $-U_d$. For reasons mentioned above, $\alpha$ is suitably limited to a value $\alpha_{min}$, and $U_S$ then cannot exceed the value $U_d \cdot \cos\alpha_{min}$. In the same way, $\alpha$ is limited, according to the invention, to an upper fixed value $\alpha_{max}$. This is chosen as near 180° as possible, and its value is determined by the fact that a certain current, which is only part of the full load current (possibly zero), is to be able to be commutated.

The upper and lower limits of $U_S$ have been shown in FIG. 2 by horizontal lines.

In case of continuous current, $U_S = U_M$ and this relation is shown by the continuous line $U_S(I = \text{cont})$ in the figure. The convertor must be capable of being controlled so that the motor current I becomes zero or almost zero. It is then necessary for the average voltage of the convertor to be lower than the e.m.f. of the motor, and in practice, among other things because of the requirement for making possible a rapid reduction of the current, it must be possible to control the voltage of the convertor to a lower value, for example according to the curve A in the figure.

The value $U_S'$ corresponds to the control angle at which the commutating ability corresponds to full load current.

The output signal $U_S^{min}$ of the function generator 12 at increasing $U_M$ follows first the horizontal line $U_d \cdot \cos\alpha_{max}$. Between $U_M''$ and $U_M'$ it follows the curve A, and for $U_M > U_M'$ it adopts the value $U_S'$.

By making the upper control angle limit variable and dependent on the e.m.f. of the load object in the manner now described, a better utilization of the convertor is obtained than what has been possible in previously known convertors.

Figure 3:
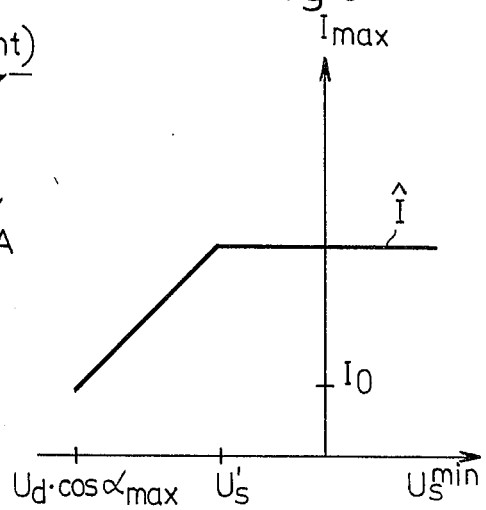
FIG. 3 shows how the current of the convertor is limited upwards in dependence on the upper limit of the control angle.

It may be advantageous also to make the current limit of the convertor variable in dependence on $U_S^{min}$. In this way security may be provided that the load current will never exceed the maximum current that can be commutated. FIG. 3 shows an example of how the output signal $I_{max}$ from the function generator 13 can be arranged to vary in dependence on the input signal $U_S^{min}$. At each control angle $I_{max}$ is chosen so that it is smaller than or equal to the maximum current that can be commutated at the control angle in question. In the example, $I_{max}$ grows linearly with increasing $U_S^{min}$ until, at $U_S^{min} = U_S'$, $I_{max} = \hat{I}$, where $\hat{I}$ is the maximum load current expected for the convertor.

Since $I_{max}$ is a function of $U_S^{min}$, which in turn is a function of $U_M$, $I_{max}$ may be obtained directly from $U_M$, if desired.

FIG. 1 describes how the variable upper limit of the control angle is obtained by varying the lower limit of the control voltage $U_S$. Alternatively, the variable control angle limit can be obtained by supplying a signal ($U_M$), corresponding to the e.m.f. of the load object, to the very control device 8 of the convertor and there letting it influence the circuits which form and limit the control angle so that the desired dependence of the upper control angle limit on the e.m.f. of the load object is obtained.

The function generators 12 and 13 can be constructed in a manner known per se, for example with the help of operational amplifiers and biased diode circuits.

The invention has been described above in connection with a single convertor, but it provides the same advantages if applied, for example, to a double convertor for four quadrant operation of a motor, or to a sequence-controlled convertor, that is a convertor comprising a number of partial convertors which are series-connected with regard to direct current, which partial convertors are successively controlled so that the control angle of only one convertor at a time is changed.

I claim:

1. A convertor control device for controlling a rotational load having a variable electromotive force, comprising:
  means for controlling the continuous current direct voltage of the convertor between a maximum value and a variable minimum value;
  sensing means for generating a signal corresponding to the electromotive force of said load;
  first function generator means for controlling said variable minimum value in accordance with said signal;
  means for generating a control signal representative of the difference between the direct current of the convertor and a current reference signal; and
  said means for controlling including a first regulator means responsive to said control signal and said first function generator means for controlling said direct voltage.

2. A convertor control device as in claim 1 further comprising means for limiting the DC current output of said convertor control device to a maximum value in accordance with said direct voltage variable minimum value.

3. A convertor control device as in claim 1 wherein said first function generator means limits said variable minimum value by that control angle at which the commutating ability of said convertor corresponds to the full load current required by said load.

4. A convertor control device as in claim 3 wherein said means for limiting the DC current includes a second function generator responsive to said first function generator for generating a second control signal, means for generating a reference speed signal;

said convertor control device further comprising means for generating a signal representative of the rotational speed of said load;

said current limiting means further including means for comparing said speed reference signal and said load rotational speed signal to generate a difference signal; and second regulator means responsive to said difference signal and said second control signal for generating said current reference signal.

5. A convertor control device as in claim 4 wherein said second control signal is limited to a maximum value at the maximum output of said first function generator means.

* * * * *